United States Patent [19]

Dewa

[11] Patent Number: 5,113,497
[45] Date of Patent: May 12, 1992

[54] I/O CONTROL SYSTEM FOR A PLURALITY OF PERIPHERAL DEVICES

[75] Inventor: Koichi Dewa, Oome, Japan

[73] Assignee: Kabushiki Kaisha Toshiba, Kawasaki, Japan

[21] Appl. No.: 664,520

[22] Filed: Mar. 5, 1991

Related U.S. Application Data

[63] Continuation of Ser. No. 326,857, Mar. 21, 1989, abandoned.

Foreign Application Priority Data

[30]

Mar. 30, 1988 [JP] Japan ................... 63-74538

[51] Int. Cl.⁵ ............................................. G06F 13/10
[52] U.S. Cl. ............................. 395/275; 395/700; 364/DIG. 1; 364/236.2; 364/238.3; 364/240.3; 364/244.6; 364/248.1; 364/259.2; 364/280.9; 364/284.2; 364/280.2
[58] Field of Search ........................... 364/200, 900

[56] References Cited

U.S. PATENT DOCUMENTS

| | | | |
|---|---|---|---|
| 3,510,843 | 3/1967 | Bennett et al. | 364/200 |
| 4,268,901 | 5/1981 | Subrizi et al. | 364/200 |
| 4,334,307 | 6/1982 | Bourgeois et al. | 364/200 |
| 4,360,870 | 11/1982 | McVey | 364/200 |
| 4,373,181 | 2/1983 | Chisholm et al. | 364/200 |
| 4,491,913 | 1/1985 | Calvignac et al. | 364/200 |
| 4,534,011 | 8/1985 | Andrews et al. | 364/900 |
| 4,556,953 | 12/1985 | Caprio et al. | 364/900 |
| 4,589,063 | 5/1986 | Shaw et al. | 364/200 |
| 4,604,690 | 8/1986 | Crabtree et al. | 364/200 |
| 4,622,633 | 11/1986 | Ceccon et al. | 364/200 |
| 4,630,269 | 12/1986 | Gershenson et al. | 371/21.2 |
| 4,631,699 | 12/1986 | Siwik et al. | 364/200 |
| 4,654,783 | 3/1987 | Veres et al. | 364/200 |
| 4,663,707 | 5/1987 | Dawson | 364/200 |
| 4,688,172 | 8/1987 | Wright | 364/200 |
| 4,701,878 | 10/1987 | Günkel et al. | 364/900 |
| 4,716,527 | 12/1987 | Graciotti | 364/200 |
| 4,727,480 | 2/1988 | Albright et al. | 364/200 |
| 4,750,136 | 6/1988 | Arpin et al. | 364/200 |
| 4,773,036 | 9/1988 | Berens et al. | 364/900 |
| 4,787,030 | 11/1988 | Harter et al. | 364/200 |
| 4,799,187 | 1/1989 | Einarson et al. | 364/900 |
| 4,803,623 | 2/1989 | Klashka et al. | 364/200 |
| 4,831,514 | 5/1989 | Turlakov et al. | 364/200 |
| 4,845,611 | 7/1989 | Turlakov et al. | 364/200 |
| 5,038,320 | 8/1991 | Heath et al. | 364/900 |

Primary Examiner—Gareth D. Shaw
Assistant Examiner—Matthew C. Fagan
Attorney, Agent, or Firm—Finnegan, Henderson, Farabow, Garrett and Dunner

[57] ABSTRACT

A basic input and output system program, (BIOS) includes a 16-bit interface hard disk controller, (HDC) control routine and an 8-bit interface HDC control routine, and also includes an automatic HDC type determination routine. The 16-bit interface HDC has an inherent I/O address (I/O port), but the 8-bit interface HDC has no inherent I/O address (I/O port). By utilizing this fact, a CPU writes specified data at the I/O address inherent to the 16-bit interface HDC. The CPU then reads out the data from the I/O address, and compares the read data with the written data. If a coincidence is obtained, the CPU determines that the 16-bit interface HDC is used, and sets up a 16-bit interface HDC control routine. On the other hand, if no coincidence is obtained, the CPU determines that the 8-bit interface HDC is used, and sets up an 8-bit interface HDC control routine.

13 Claims, 1 Drawing Sheet

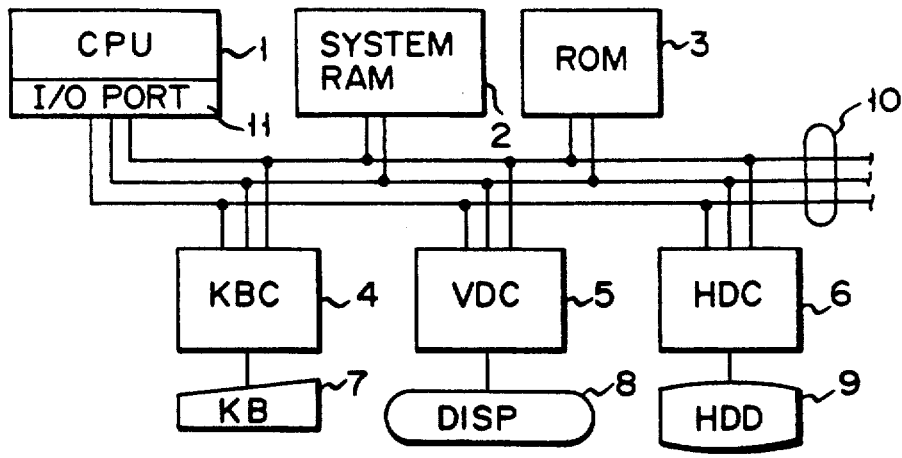
F I G. 1
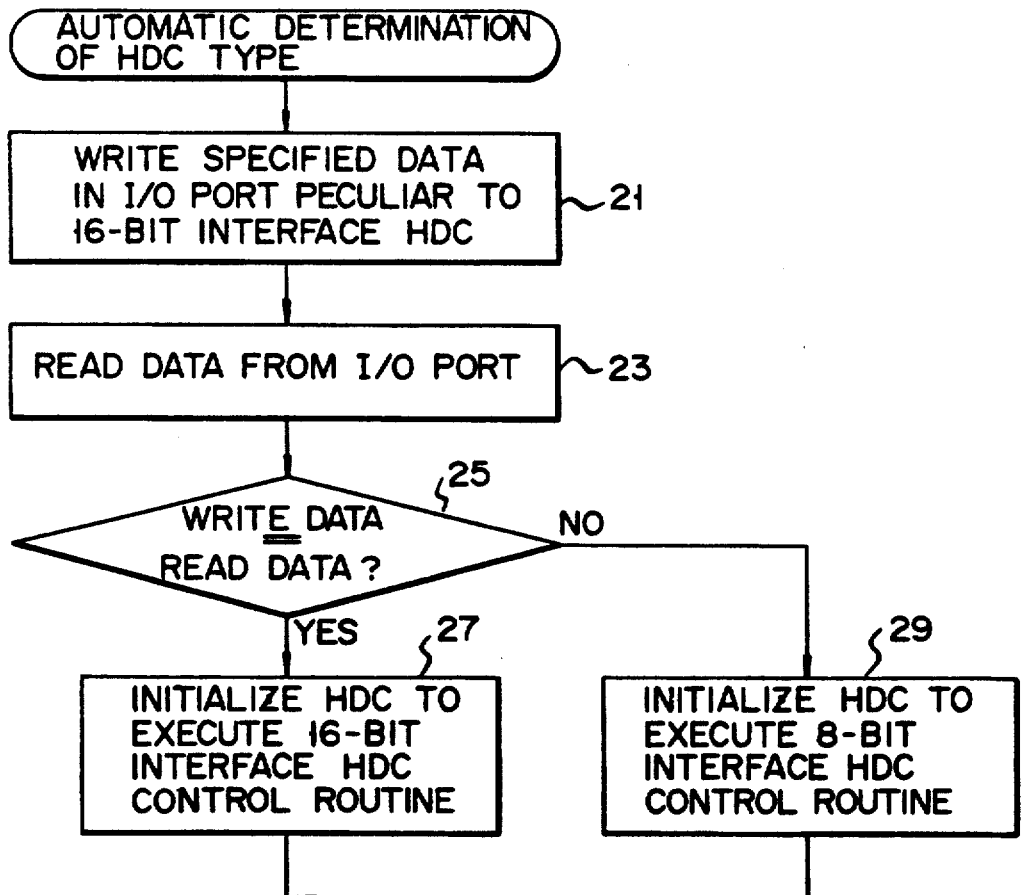
F I G. 2

5,113,497

I/O CONTROL SYSTEM FOR A PLURALITY OF PERIPHERAL DEVICES

This application is a continuation of application Ser. No. 07/326,857, filed Mar. 21, 1989, now abandoned.

BACKGROUND OF THE INVENTION

1. Field of the Invention

The present invention relates to an input and output control system which can control peripheral devices having the same category but different control procedures without providing special-purpose BIOSs (basic input and output system programs).

2. Description of the Related Art

In recent years, along with the development of semiconductor techniques, very inexpensive LSIs such as microprocessors, memories, peripheral controllers, and the like are available. These LSIs are combined according to applications, and a standard OS (Operating System Program) or a commercially available application program is loaded, thus constituting a relatively high-performance computer system. A typical computer system of this type is a personal computer.

In the field of personal computers, hard disk devices (HDDs) are increasingly adapted as standard equipment. For a hard disk controller (HDC) for controlling the HDD, two international standard architectures are known. The first type of HDC has a 16-bit data bus width (to be referred to as a 16-bit interface HDC hereinafter). The second type of HDC has an 8-bit data bus width (to be referred to as an 8-bit interface HDC hereinafter).

Since these two HDCs do not simultaneously exist on a single system, a basic input and output system program (BIOS) is programmed to control one of these HDCs.

However, it is not preferable from a general purpose viewpoint that two types of BIOSs exist for controlling two different types of HDCs. Therefore, a demand has arisen for a general purpose input and output control system which can control a plurality of peripheral devices having the same category but different control procedures without providing special-purpose BIOSs.

SUMMARY OF THE INVENTION

It is an object of the present invention to provide an input and output control system which can control peripheral controllers having the same category but different control procedures without providing special-purpose BIOSs.

In order to achieve the above object, an input and output control system of the present invention is adapted for a computer system to which one of at least first and second input and output (I/O) devices are selectively connected, where said first and second I/O devices have the same category but different control, procedure. The structure comprises a memory means for storing a basic input and output system program, including a first input and output (I/O) control routine for said first device, and a second input and output (I/O) control routine for said second I/O device; input and output (I/O) port means connected to one of said first and second I/O devices; means for writing specified data to said I/O port means; means for reading data from said I/O port means; means, coupled to said writing means and said reading means, for comparing the read-out data with said specified data; means, coupled to said comparing means, for determining that said I/O device connected to said I/O port, is connected to said computer system, when a coincidence is obtained by said comparing means; and means, coupled to said determining means, for setting up the I/O control routine for said I/O device connected to said I/O port.

According to the input and output control system of the present invention, a 16-bit interface HDC control routine and an 8-bit interface HDC control routine are programmed in one BIOS, so that a plurality of types of BIOS need not be provided for different types of HDCs. As a result, the BIOS can have versatility, and the HDC type can be changed to improve flexibility of the system.

BRIEF DESCRIPTION OF THE DRAWINGS

Other objects and features of the present invention will be apparent from the following description taken in connection with the accompanied drawings in which:

FIG. 1 is a block diagram showing an embodiment of an input and output control system of the present invention; and FIG. 2 is a flow chart of an automatic HDC type determination routine in a BIOS used in the embodiment shown in FIG. 1.

DETAILED DESCRIPTION OF THE PREFERRED EMBODIMENTS

An embodiment of the present invention will now be described.

FIG. 1 is a block diagram showing an embodiment of an input and output control system of the present invention. CPU 1 comprises, e.g., a 32-bit microprocessor i80386 available from Intel Corp., U.S.A. CPU 1 is connected to system RAM 2, storing an operation system program (OS) and processing data, and ROM 3, storing a BIOS through system bus 10 consisting of address lines, data lines, and control lines. CPU 1 is also connected to keyboard controller (KBC) 4, visual display controller (VDC) 5, and hard disk controller (HDC) 6. KBC 4 is connected to keyboard (KB) 7 for inputting data. VDC 5 is connected to display (DISP) 8 for displaying data. HDC 6 is connected to hard disk device (HDD) 9 as an external storage for storing data. HDC 6 is one of 8- and 16-bit interface HDCs. HDC 6, VDC 5, and KBC 4 are controlled by the BIOS stored in ROM 3.

The operation of the embodiment of the present invention with the above arrangement will be described below with reference to the flow chart shown in FIG. 2.

When the system is started, the BIOS performs tests of I/O devices 4, 5, and 6, and initialization (switching of a BIOS vector, resetting of the HDC, and the like). Upon initialization of the HDC, the HDC type is determined as follows.

Automatic determination of 16- and 8-bit interface HDCs can be made because the 16-bit interface HDC, as the international standard architecture, has an inherent I/O port (I/O address), and the 8-bit interface HDC has no inherent I/O port (I/O address). First, in step 21, CPU 1 writes specified data in an I/O port (at an I/O address) inherent to the 16-bit interface HDC under the control of the BIOS stored in ROM 3. If the 16-bit interface HDC is used, the specified data (e.g., "1") can be written at the I/O address. On the other hand, if the 8-bit interface HDC is used, since the designated I/O address is not present, CPU 1 writes no data, and completes the write access. In step 23, CPU 1 designates the I/O address, and reads the data. In this case, if the 16-bit interface HDC is used, the read data is "1", while if the 8-bit interface HDC is used, the read data is indefinite data, e.g., "FF".

In step 25, CPU 1 compares the written data and read data. As a result of comparison, if a coincidence is obtained, CPU 1 determines that the 16-bit interface HDC is used, and sets up a 16-bit interface HDC control routine in step 27.

On the other hand, if no coincidence is obtained between the written data and read data in step 25, CPU 1 determines that the 8-bit interface HDC is used, and sets up an 8-bit interface HDC control routine in step 29.

Note that the present invention is not limited to the above embodiment. In the above embodiment, the input and output control system of the present invention is applied to automatic determination of the 8- and 16-bit interface HDCs. However, the input and output control system of the present invention can be applied to peripheral devices which have the same category but different command architectures, peripheral devices having the same category, one of which has an I/O port and the other of which has no I/O port, or peripheral devices having the same category but different control procedures.

What is claimed is:

1. A method for determining the kind of input-output controller means, to control an input-output device means, connected to a personal computer system, from which the input-output controller means and the input-output device means are removable, the personal computer system including input-output address port means for assigning an address space to communicate with the input-output controller means, including the steps of:

outputting specified data to the input-output controller means through the input-output address port means at power-on of the personal computer system;

reading data from the input-output controller means through the input-output address port means;

comparing the data read out from the input-output controller means with the specified data to obtain a comparison result; and determining the kind of the input-output controller means connected to the personal computer system in accordance with the comparison result.

2. The method according to claim 1, further including the step of:

executing a single basic input and output program system to operate the input-output device means after the kind of the input-output controller means connected to the personal computer system is determined.

3. The method according to claim 1, further including the step of:

interfacing the input-output device means to communicate with the personal computer system with one of an m-bit width and an n-bit width interface, where m and n are both integers, after the kind of the input-output controller means connected to the personal computer system is determined.

4. In an input and output control system for a computer system to which one of at least first and second input and output (I/O) devices is alternatively connected, said first and second I/O devices being of a same category and having an I/O controller controlling said first and second I/O device with a different control procedure, said computer system having a memory for storing a single basic input and output system program including a first input and output (I/O) control routine corresponding to said first I/O device and a second input and output (I/O) control routine corresponding to said second I/O device, and an input and output (I/O) port connected to only one of said first and second I/O devices, a method for executing an operation comprising the steps of:

writing specified data to said I/O port;

reading data from said I/O port;

comparing the data read out from said I/O port with the specified data;

determining that one of said first and second I/O devices, connected to said I/O port, is connected to said computer system, when the comparison indicates a coincidence between the data read out and the specified data; and executing one of said first and second I/O control routines corresponding to said one of said first and second I/O devices determined to be connected to said I/O port.

5. An input and output (I/O) control method for a personal computer system to which a first I/O device, having an m-bit width, where m is an integer, and a first interface means, and a second I/O device, having an n-bit width, where n is an integer and m>n, and a second interface means, are alternatively connected, said personal computer system having a single basic input and output system program (BIOS) including a first I/O control routine corresponding to said first I/O device and a second I/O control routine corresponding to said second I/O device, said method comprising the computer steps of:

writing specified data to one of said first and second interface means;

reading data from said one of said first and second interface means;

comparing the data read out from said one of said first and second interface means with the specified data;

determining whether said first I/O device or said second I/O device is connected to the computer system when coincidence or no coincidence, respectively, is obtained in the comparing step; and executing one of the first and second control routines includes in the BIOS corresponding to one of the first and second I/O devices determined to be connected to the personal computer system.

6. In a personal computer system including input-output device means, which is removable therefrom, an apparatus for determining a type of input-output controller means comprising:

memory means for storing a plurality of program instructions;

first processing means, coupled to the memory means, for controlling the personal computer system in accordance with the plurality of program instructions, the first processing means including input-output address port means for assigning an address space to communicate with an input-output controller means coupled between the first processing means and the input-output device means;

the input-output controller means, for controlling the input-output device means and for receiving specified data from the first processing means at power-on of the personal computer system; and second processing means, coupled to the input-output address port means, including:

means for reading data from the input-output controller means through the input-output address port means;

comparing means, coupled to the reading means, for comparing the data read out by the reading means with the specified data, and for outputting a comparison result; and determining means, coupled to the comparing means, for determining the type of input-output controller means which is coupled to the input-output device means, in accordance with the comparison result output from the comparing means.

7. The personal computer system according to claim 6, wherein the input-output controller means has one of an m-bit width and an n-bit width interface, where m and n are both integers.

8. The personal computer system according to claim 7, wherein the input-output device means comprises a hard-disk drive.

9. The personal computer system according to claim 6, wherein the memory means comprises a read-only memory means for storing a single basic input and output system program to operate the input-output device means.

10. The personal computer system according to claim 9, further comprising:

means, coupled to the determining means and the read-only memory means, for executing the single basic input and output system program to operate the input-output device means.

11. An input and output control system for a computer system to which one of at least first and second input and output (I/O) devices is alternatively connected, said first and second I/O devices each being of a same category and having an I/O controller controlling said first and second I/O devices with different control procedures, comprising:

memory means for storing a single basic input and output system program including a first input and output (I/O) control routine corresponding to said first I/O device and a second input and output (I/O) control routine corresponding to said second I/O device;

input and output (I/O) port means for connecting only one of said first and second I/O devices;

means, coupled to said I/O port means, for writing specified data to said I/O port means;

means, coupled to said I/O port means, for reading data from said I/O port means;

means, coupled to said writing means and to said reading means, for comparing data read out by said reading means with said specified data;

means, coupled to said comparing means, for determining that one of said first and second I/O devices, connected to said I/O port means, is connected to said computer system, when a coincidence between said data read out by said reading means and said specified data is obtained by said comparing means; and means, coupled to said determining means and said memory means, for executing one of the first and second I/O control routines corresponding to said one of said first and second I/O devices determined to be connected to said I/O port means.

12. A system according to claim 1, wherein said first and second I/O devices are hard-disk drives.

13. An input and output (I/O) control system for a personal computer system to which first and second I/O devices are alternatively connected, the first I/O device having a m-bit width, where m is an integer, and a first interface means, and the second I/O device having a n-bit width, where n is an integer and m>n, and a second interface means, comprising:

a single basic input and output system program (BIOS) means for storing a first I/O control routine for said first I/O device and a second I/O control routine for said second I/O device;

means, coupled to one of said first and second interface means, for writing specified data to said one of said first and second interface means;

means, coupled to said one of said first and second interface means, for reading data from said one of said first and second interface means;

means, coupled to said writing means and to said reading means, for comparing the data read out by said reading means with the specified data;

means, coupled to said comparing means, for determining that said first I/O device and said second I/O device are connected to said computer system, when a coincidence and no coincidence, respectively, are obtained by said comparing means; and means, coupled to said determining means and said BIOS means, for executing one of the first and the second I/O control routines in the BIOS means corresponding to one of said I/O devices determined to be connected to said personal computer system.

* * * * *

UNITED STATES PATENT AND TRADEMARK OFFICE
CERTIFICATE OF CORRECTION

PATENT NO. : 5,113,497

DATED : May 12, 1992

INVENTOR(S) : Koichi Dewa

It is certified that error appears in the above-identified patent and that said Letters Patent is hereby corrected as shown below:

Claim 4, column 3, line 67, change "device" to --devices--.

Claim 5, column 4, line 46, change "includes" to --included--.

Claim 12, column 6, line 16, change "claim 1" to --claim 11--.

UNITED STATES PATENT AND TRADEMARK OFFICE
CERTIFICATE OF CORRECTION

PATENT NO. : 5,113,497
DATED : May 12, 1992
INVENTOR(S) : Koichi Dewa

It is certified that error appears in the above-indentified patent and that said Letters Patent is hereby corrected as shown below:

Column 6, line 21, after "having" change "a" to --an--.

Signed and Sealed this

Seventh Day of December, 1993

Attest:

BRUCE LEHMAN

Attesting Officer          Commissioner of Patents and Trademarks